Oct. 22, 1940.                A. G. HOPKINS                2,218,911
                JETTER FOR BEVERAGE PACKAGING APPARATUS
                        Filed Jan. 19, 1937
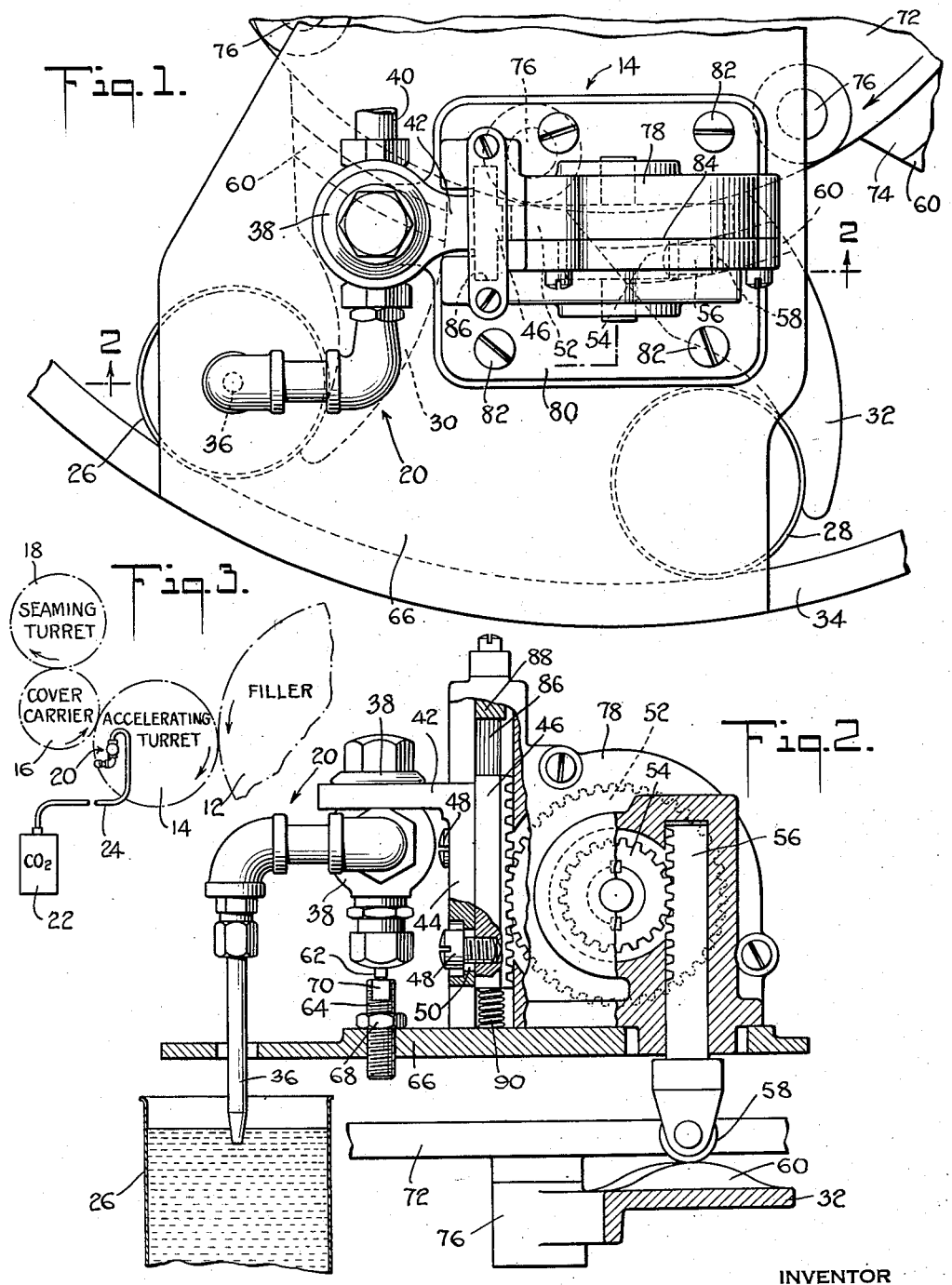
INVENTOR
Arthur G. Hopkins
BY
James Franklin
ATTORNEYS Patented Oct. 22, 1940

2,218,911

UNITED STATES PATENT OFFICE 2,218,911

JETTER FOR BEVERAGE PACKAGING APPARATUS

Arthur G. Hopkins, Maspeth, N. Y., assignor to McKeesport Tin Plate Corporation, a corporation of Delaware Application January 19, 1937, Serial No. 121,283

9 Claims. (Cl. 226—69)

This invention relates to beverage packaging apparatus, and more particularly to a jetter therefor.

The object of the invention is to generally improve the method and apparatus for packaging beverages, and more especially for canning beer.

Inasmuch as any container such as a can cannot be filled perfectly full before closing and sealing the same, there is entrapped in the package a quantity of air which may be as high as fifteen cubic centimeters per can. The oxygen of this air tends to react with the beer, and in the course of storage eventually induces variations in flavor as well as "veiling" and "shooting." The inclusion of air in the packaged beer leads to the following faults and difficulties: (1) off taste, (2) poor foam qualities, (3) poor gas retention, (4) lack of distinctive aroma, (5) instability, and (6) "wildness." To help eliminate these difficulties, it has been attempted to incorporate chemicals with the beer, but this introduces other disadvantages fully as serious as the faults sought to be cured.

In accordance with a feature and object of my invention, the air in the top or head space of the can is jetted out with carbon dioxide gas. The gas is heavy and displaces the air upwardly. More preferably, the jet of carbon dioxide gas is discharged beneath the surface of the beer, thus causing immediate agitation and bubbling and foaming of the beer, which itself displaces and eliminates the air from the head space. The air is thus eliminated by the combined action of bubbles of injected carbon dioxide, and natural beer foam. When the air is eliminated or minimized by this method, the product is of excellent quality because the only ingredient added to the beer, the carbon dioxide, is itself a preservative of benefit to the beer, instead of being a chemical adulterant.

Another and more specific object of the invention resides in the application of a jetter as above described to canning apparatus, especially to an accelerating turret such as is described in my copending application Serial Number 121,284, filed January 19, 1937, entitled "Accelerating device."

To the accomplishment of the foregoing and other more particularized objects which will hereinafter appear, my invention consists in the beverage-packaging and jetter elements and their relation to one another, as hereinafter are more particularly described in the specification and sought to be defined in the claims. The specification is accompanied by a drawing in which:

Fig. 1 is a plan view showing a preferred form of jetter applied to an accelerating turret;

Fig. 2 is a section taken in elevation in the plane of the line 2—2 of Fig. 1;

Fig. 3 is a schematic plan view of beer canning apparatus embodying my invention.

Referring to the drawing, and more particularly to Fig. 3, the empty beer cans are filled by a suitable beer filler 12. This filler may be of standard type, and ordinarily is rather large in diameter and comprises a large number of can pockets so that the cans may be filled comparatively slowly with beer in a quiescent state in order to prevent undesired foaming thereof. The filled cans of beer are taken from filler 12 by an accelerating turret 14 which smoothly accelerates the cans from the relatively low speed of filler 12 to the comparatively high speed of a cover-carrier turret 16 which immediatley precedes a can-seaming turret 18. The accelerating turret 14 is preferably of the type described in my co-pending application Serial Number 121,284 previously referred to. Cover carrier 16 is supplied with can ends and applies a can end to each of the filled cans supplied to it by the accelerating turret. The turret 16 is preferably of the type described in my patent No. 2,032,481, issued March 3, 1936, and entitled "Seaming machine." As is there described, the can end is preferably applied to the can as soon as possible, preferably slightly ahead of center-to-center relation of the turrets 14 and 16, and is held down tightly on the can during transfer of the covered can to the seaming turret, where the end is seamed to the can body.

In accordance with the present invention, the apparatus is provided with a jetter generally designated 20, the said jetter being located in the path of travel of the cans in the accelerating turret 14 and immediately preceding the cover-carrier turret 16. Jetter 20 is supplied with carbon dioxide gas from a suitable source 22 through a preferably flexible pipe 24. The filler and accelerator are designed to minimize and discourage foaming of the beer. The jetter 20 purposely agitates and foams the beer, but this takes place just before the can is covered by the can end, and the interval of time therebetween is made adequate for displacement of air from the head space of the can, but insufficient to result in overflow of beer from the can.

The jetter 20 may be described in greater detail with reference to Figs. 1 and 2 of the drawing. The series of cans being moved by the accelerating turret from the filler to the cover-carrier is partially indicated in Fig. 1 by the cans 26 and 28. These cans move along a suitable arcuate can track and are guided against outward movement away from the accelerating fingers 30 and 32 by an appropriate guide rail 34.

The jetter comprises a nozzle 36 connected through appropriate pipe fittings to a valve 38 and thence to a supply pipe leading into the valve, a fragment of the pipe being indicated at 40. At least a part of the pipe 40 is made of rubber tubing, thus accommodating the up and down movement of the nozzle and valve.

Valve 38 is fixedly mounted on the horizontal arm 42 of an angle bracket, the vertical arm 44 of which is secured to a vertically reciprocable rack 46. Bracket 44 and rack 46 are connected by screws 48, and these are preferably received in slots 50, thus affording vertical adjustment of the bracket with respect to the rack, which in turn determines the depth of immersion of the nozzle 36 when in lowermost position.

Rack 46 meshes with a gear 52 which is secured directly to a smaller gear 54, and the latter meshes with a vertically reciprocable rack 56, the lower end of which is provided with a cam follower roller 58. Roller 58 cooperates with a cam surface 60, and when the cam rises as shown in Fig. 2, the rack 56 is elevated, thereby turning the gears counterclockwise and so depressing the rack 46 and with it the nozzle 36. In Fig. 2 the nozzle is shown in lowered position and the tip of the nozzle is immersed in the beer.

Valve 38 is normally closed, but is opened by upward pressure on a pin 62 projecting from the bottom of the valve. Appropriate means, here exemplified by threaded stud 64, is provided to cooperate with valve plunger 62. Specifically, stud 64 is threadedly received in stationary support plate 66, and is adjusted to bring its upper end in such position that when the valve is depressed the valve plunger 62 strikes the upper end of the stud, thus elevating the same and opening the valve. The adjustment of stud 64 is locked by lock nut 68. To prevent excessive wear at the upper end of the stud, the stud may be counterbored and filled with a special hardened plug 70.

Cam 60 may be a continuous ring rotatable with the turret and provided with cam rises disposed at the same spacing as the cans when the latter pass beneath the jetter. In the present case, however, I employ a series of small cam surfaces, one of which is located on each of the accelerating fingers. As is more fully described in my co-pending application Serial Number 121,284 aforesaid, the present accelerating turret comprises a disc 72 rotating at uniform velocity and carrying a series of accelerating fingers such as the fingers 30 and 32 indicated in Fig. 1. A fragment of still another accelerating finger is indicated at 74. These fingers are pivotally mounted on disc 72 as is indicated at 76. Each finger is provided with a cam follower, not shown, which cooperates with a stationary cam groove to cause oscillation of the fingers relative to the turret, thus producing the desired acceleration of the cans. With the invention as here disclosed, each of the accelerating fingers carries a camming surface 60 designed to cooperate with the cam follower 58 of the jetter. As will be clear from inspection of Figs. 1 and 2, the cam 60 on one finger, for example the finger 32, depresses the jetter nozzle into a can moved by the preceding finger, in this case the finger 30. Similarly, when can 28 reaches the position now occupied by can 26, the cam 60 of finger 74 depresses the jetter nozzle.

The gear and rack arrangement illustrated serves two functions. First, it increases the vertical movement of the nozzle relative to the vertical movement of the cam follower so that adequate movement of the nozzle may be obtained without utilizing too steep or abrupt an angle for the cam 60. The second function is in converting upward movement of the cam follower into downward movement of the nozzle, this being desirable because when a series of short discrete cams are employed, as when the cams are mounted on separate fingers, it is necessary to positively limit the downward movement of the cam follower between successive fingers. This in turn requires that the cams produce an upward movement of the cam follower. The gear and rack arrangement illustrated is also more compact and localized than would be a simple pivoted lever arrangement designed to produce the same relative movement. However, I have designed jetters of this nature using a lever movement rather than a gear and rack arrangement.

The gears 52 and 54 are housed within a housing 78, the base 80 of which is mounted on support plate 66 by means of screws 82. Housing 78 is separable on the line 84, thus providing access to the gears therewithin. Rack 56 is guided within housing 78 and rack 46 is guided in special ways 86 formed integrally with the housing. The downward movement of cam follower 58 is limited by reason of a top block 88 which directly limits the upward movement of rack 46 and so indirectly limits the downward movement of rack 56 which is geared thereto. A small helical spring 90 located beneath the bottom of rack 46 cushions the movement of the rack near its lowermost position.

It will be understood that the rise of cam 60 is limited in time to an amount which will insure that the downward movement of the jetter nozzle 36 takes place safely within the walls of can 26. In other words, the nozzle is not moved downwardly until the leading edge of the can has passed the nozzle, and conversely, the nozzle is elevated well out of the can before the trailing edge of the can reaches the nozzle. The immersion of the nozzle into the beer is therefore but momentary, and the jet discharge of carbon dioxide gas into the beer is also but momentary in duration. Nevertheless, the physical agitation of the beer together with the carbon dioxide actually injected therein cause prompt bubbling and foaming of the beer with consequent displacement of air upwardly from the head space of the can. Inasmuch as the jetter is located immediately preceding the point of transfer of the can to the cover-carrier 16, as is indicated in Fig. 3, the cover is placed over the can quickly enough to prevent overflow or spillage of beer from the can.

It is believed that the construction and operation, as well as the many advantages, of my improved method and apparatus for displacing air when packaging beer or a like beverge, such as ale, will be apparent from the foregoing detailed description thereof. The method is simple and almost instantaneous. It is economical in its use of gas, for the actual discharge of gas is only momentary. The apparatus is compact, inexpensive, and may be added to the regular packaging apparatus without requiring the use of a special track or turret, and without enlarging or rebuilding existing equipment. The device may be added as an accessory, yet operates efficiently, dependably and effectively to accomplish the desired purpose.

It will be apparent that while I have shown and described my invention in a preferred form, many changes and modifications may be made in the structure disclosed without departing from the spirit of the invention defined in the following claims.

I claim:

1. Apparatus for the packaging of beer in containers, said apparatus comprising a beverage filler, and accelerating turret for taking filled containers from the filler and accelerating the same, a gas discharge nozzle disposed above the path of movement of said containers, a valve for controlling the discharge of gas from said nozzle, means to lower the nozzle as a filled container moved by the accelerating turret comes therebeneath and to elevate the same preparatory to movement of another container therebeneath, said last named means producing a downward movement of the nozzle which is adequate to bring the gas discharging tip of the nozzle beneath the surface of the beer in the container, and means cooperating with the valve to open the valve when the nozzle is immersed in the beer as aforesaid.

2. Apparatus for packaging a beverage in containers, said apparatus comprising a beverage filler, an accelerating turret for taking filled containers from the filler and accelerating the same, a gas discharge jetting nozzle reciprocably mounted for movement into and out of the containers as they are moved by the accelerating turret, and cam means rotatable with the turret for lowering the nozzle into each of the containers.

3. Apparatus for packaging a beverage in containers, said apparatus comprising a beverage filler, an accelerating turret for taking filled containers from the filler and accelerating the same, a nozzle reciprocably mounted for movement into and out of the containers as they are moved by the accelerating turret, a valve associated with said nozzle in order to momentarily supply gas thereto when the nozzle is in lowered position, and cam means rotatable with the turret for lowering the nozzle into each of the containers.

4. Apparatus for packaging beer in containers, said apparatus comprising a beer filler, an accelerating turret for taking filled containers of beer from the filler and accelerating the same, a nozzle reciprocably mounted for movement into and out of the containers as they are moved by the accelerating turret, a valve associated with said nozzle in order to momentarily supply gas thereto when the nozzle is in depressed position, and cam means rotatable with the turret for depressing the nozzle into each of the containers, said cam means having a substantial displacement so selected and related to the other parts of the apparatus as to cause a movement of the nozzle sufficient to immerse the nozzle in the beer.

5. Apparatus for canning a readily foaming beverage, said apparatus comprising a filler, an accelerating turret including a plurality of can accelerating fingers projecting outwardly therefrom, a can-seaming turret, a cover-carrier turret arranged to apply can ends to the filled cans leaving the accelerating turret and to transfer the same to the seaming turret, and jetting mechanism to remove air from the top of the can before applying the can end thereto, said mechanism including means to momentarily discharge a jet of carbon dioxide gas at a point located beneath the surface of the beverage in each can immediately preceding the cover-carrier turret.

6. Apparatus for canning a beverage, said apparatus comprising a filler, an accelerating turret including a plurality of can accelerating fingers projecting outwardly therefrom, a can-seaming turret, a cover-carrier turret arranged to apply can ends to the filled cans leaving the accelerating turret and to transfer the same to the seaming turret, and jetting mechanism to remove air from the top of the can before applying the end thereto, said mechanism including a vertically reciprocable nozzle disposed over the path of movement of the accelerating fingers of the accelerating turret at a point immediately preceding the cover-carrier turret, a cam mounted on each of the aforesaid accelerating fingers, and mechanism whereby said cam functions to lower the nozzle into each can as the can passes the nozzle.

7. Apparatus for canning a readily foaming beverage, said apparatus comprising a filler, an accelerating turret including a plurality of can accelerating fingers projecting outwardly therefrom, a can-seaming turret, a cover-carrier turret arranged to apply can ends to the filled cans leaving the accelerating turret and to transfer the same to the seaming turret, and jetting mechanism to remove air from the top of the can before applying the can end thereto, said mechanism including a vertically reciprocable nozzle disposed over the path of movement of the accelerating fingers of the accelerating turret at a point immediately preceding the cover-carrier turret, a cam mounted on each of the aforesaid accelerating fingers, and mechanism whereby said cam functions to lower the nozzle into each can as the can passes the nozzle, the throw of the cam being substantial and being so selected and related to the other parts of the apparatus that downward movement of the nozzle is sufficient to immerse the tip of the nozzle in the beverage.

8. Apparatus for canning a beverage, said apparatus comprising a filler, an accelerating turret including a plurality of can accelerating fingers projecting outwardly therefrom, a can-seaming turret, a cover-carrier turret arranged to apply can ends to the filled cans leaving the accelerating turret and to transfer the same to the seaming turret, and jetting mechanism to remove air from the top of the can before applying the can end thereto, said mechanism including a vertically reciprocable nozzle disposed over the path of movement of the accelerating fingers of the accelerating turret at a point immediately preceding the cover-carrier turret, a valve associated with said nozzle for controlling the supply of gas thereto, means cooperating with the valve for momentarily opening the valve when the nozzle is lowered, a cam mounted on each of the aforesaid accelerating fingers, and mechanism whereby said cam functions to lower the nozzle into each can as the can passes the nozzle.

9. Apparatus for canning beer or like beverage, said apparatus comprising a filler, an accelerating turret, a can-seaming turret, a cover-carrier turret arranged to apply can ends to the filled cans leaving the accelerating turret and to transfer the same to the seaming turret, and jetting mechanism to foam the beer and remove air from the head space of the can before applying the can end thereto, said mechanism including a vertically reciprocable jetting nozzle to momentarily discharge a jet of carbon dioxide gas below the surface of the beer in each can immediately preceding the cover-carrier turret, and means to reciprocate said jetting nozzle an amount sufficient to clear the cans when the nozzle is elevated, and to immerse the nozzle below the surface of the beer when the nozzle is lowered.

ARTHUR G. HOPKINS.